United States Patent [19]

Kaiser et al.

[11] 4,216,606
[45] Aug. 12, 1980

[54] MOUSETRAP

[76] Inventors: Dennis G. Kaiser, 934 Hillside Dr.;
Robert D. Kaiser, 2066 McDivitt Ct.,
both of Milford, Mich. 48042

[21] Appl. No.: 944,429

[22] Filed: Sep. 21, 1978

[51] Int. Cl.² ............................................. A01M 23/30
[52] U.S. Cl. .................................................... 43/83
[58] Field of Search ....................... 43/81, 82, 83, 83.5

[56] References Cited
U.S. PATENT DOCUMENTS

| | | | |
|---|---|---|---|
| 2,494,957 | 1/1950 | Blair | 43/81 |
| 2,603,906 | 7/1952 | Koch et al. | 43/83.5 |
| 3,992,803 | 11/1976 | Kaiser | 43/83 |

Primary Examiner—James G. Smith
Attorney, Agent, or Firm—Reising, Ethington, Barnard, Perry & Brooks

[57] ABSTRACT

An enclosed passageway which provides a housing that is open at one end and has a back wall member on which is mounted a trap mechanism, is provided. The trap mechanism is capable of being both set and baited from outside the enclosed housing without handling the trap mechanism itself and which is disposable or capable of having the entrapped and killed animal displaced therefrom without personal contact. A tripping member of the trap mechanism is provided to trigger the trap without requiring the animal to contact the bait.

4 Claims, 4 Drawing Figures

MOUSETRAP

TECHNICAL FIELD

This invention relates to mousetraps and in particular to mousetraps that have a tripping member to trigger the set baited trap without requiring the animal to contact the bait.

BACKGROUND ART

One of the most commonly used traps for mice and rats includes a flat rectangular wooden base with a pivotally mounted spring loaded bail which is held in a loaded condition by a wire rod engaged under a tripping device that holds the trap bait so that the bail is sprung when the bait is disturbed.

Although this type of trap is relatively inexpensive, it is dangerous to use in places where there are small children and pets because it is so open and exposed. It is also very repulsive and unsightly when a mouse or rat is caught and killed in it. Another problem is that the open access available from all sides enables the bait to be approached from behind or otherwise inside the sweep of the bail wire and for smaller mice to take the bait without being caught or killed. Although there are other types of traps, some of which catch rather than kill the small animal, there is always the problem of removing the mouse or rat from the trap if it is to be used again or throwing the whole trap away. In every instance there is the problem of disposal before decomposition and resulting odors occur.

While there are also poisons and dehydrating tidbits used to entice, catch and kill mice, rats and the like, these are dangerous to have around and cause a dying mouse or rat to crawl into an inaccessable place with the same decomposition and odor problem.

A mouse or rodent trap which solves many of the above problems is shown in the U.S. Pat. No. 3,992,803 to Kaiser which is hereby incorporated by reference. The inventor in the above-noted patent is one of the co-inventors of the invention of the subject application. The present application discloses a mousetrap that is an improvement over the mousetrap shown in the above-noted patent. The present application discloses structural features which substantially reduce the cost of building the subject mousetrap and also provide a better mousetrap. The cost is reduced by simplifying the structure of the mousetrap and also the assembly thereof.

A further improvement over the mousetrap of the cited patent is the provision of a tripping member which cooperates with a catching member, a bail wire, and a back wall member to cause a set trap to be triggered without the rat having contacted the bait.

Several prior patents disclose a triggering or tripping mechanism which do not form part of the catching member. For example, U.S. Pat. No. 1,218,406 to Jackson discloses a trigger platform hinged to the rear wall compartment above the point at which a jaw member is hinged. Likewise, British Pat. No. 179,305 discloses a tilting platform adapted to be actuated by an animal entering the trap whereby a previously set spring jaw is released in front to a trapping position.

Other mousetraps generally of the type to which this invention relates are disclosed by the U.S. Pat. Nos. 2,099,021 of Landes and 2,684,553 of Schroeder.

DISCLOSURE OF THE INVENTION

An object of the present invention is to provide an improved mousetrap having an enclosed passageway with a back wall member including a pair of spaced projecting portions disposed near the lower edges of the back wall member and wherein a tripping member is pivotally connected at the projecting portions to move a catching member out of catching engagement with a bail wire after a fixed amount of movement by the tripping member.

Another object of the invention is to provide a mousetrap which is simple to construct and wherein the trap mechanism is wholly contained and provided upon the back wall member of the trap.

A further object of the invention is to provide a mousetrap that is relatively simple and inexpensive to make and wherein the mousetrap provides a total enclosure with access from only one end thereof and a trap mechanism which is mounted on the back wall member and which is baited and loaded externally.

Another object of the present invention is to provide a mousetrap that is capable of being made from a one piece plastic extrusion, one end of which is completely closed by an end wall which has a trap mechanism mounted thereon in a relatively inexpensive fashion.

In caring out the above objects and other objects of this invention, a preferred embodiment of the trap includes a member for providing a passageway of sufficient length to receive and retain a rodent there within. The passageway member is provided with a ground level access at one end thereof and a back wall member provided at the other end and for closure thereof. The passageway member has a spring-loaded bail wire trap mechanism mounted wholly thereupon. The passageway member further has enclosing restrictive wall surfaces sufficiently and closely spaced to preclude other than a frontal ground level approach by a rodent attracted into the passageway member and relatively towards the trap mechanism. The passageway member further has upper, side and bottom walls providing the enclosing and restrictive wall surfaces and which is formed to receive and retain the back wall member in fixed engagement therewith. The trap mechanism is preassembled and mounted on the back wall member, the back wall member including a pair of spaced projecting portions disposed near the lower edge thereof. The trap mechanism includes a spring-loaded bail wire movably mounted on the projecting portions of the back wall member. A bail wire catching member is movably mounted on the back wall member and has a weighted end receptive of rodent attracting bait. An access notch is formed through the back wall member and a cable connection extends through the notch to engage the bail wire for drawing the bail wire up towards the back wall member for catching engagement with the catching member. A tripping member is movably connected at the projecting portions, the bail wire securing the movable connection. The tripping member moves the catching member out of catching engagement with the bail wire after a fixed amount of movement by the tripping member. The trap mechanism is wholly contained and provided upon the back wall member.

The objects, features and advantages of the present invention are readily apparent from the following detailed description of the best mode taken in connection with the accompanying drawings.

BEST MODE FOR CARRYING OUT THE INVENTION

Figure 1:
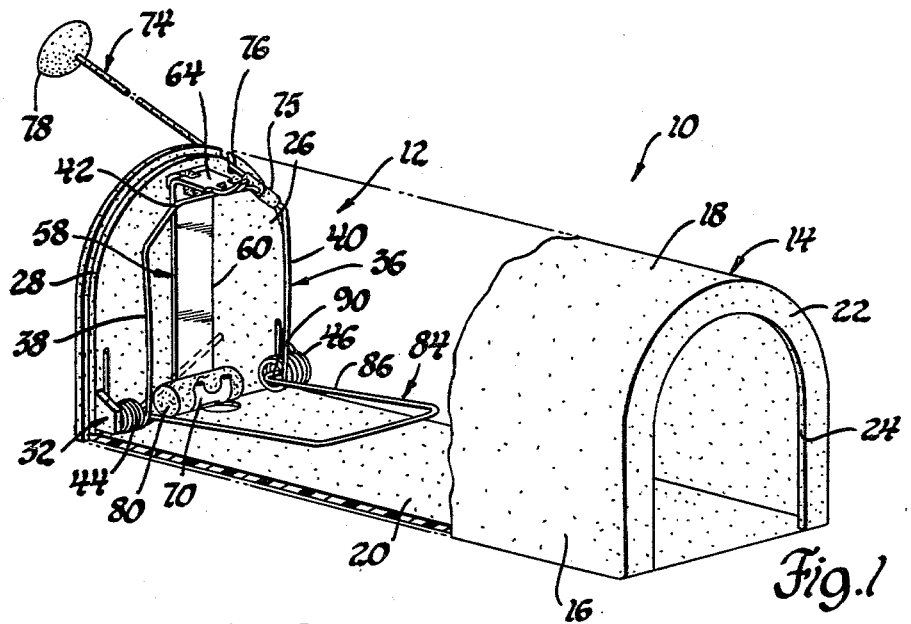
FIG. 1 is a perspective view of the mousetrap of the present invention with a side wall and a roof section partially broken away to show the inside back wall and trap mechanism.

Referring to FIG. 1, a mousetrap constructed according to the present invention is generally indicated at 10. The mousetrap 10 is in the form and shape of a small house which is made of molded plastic parts that are engaged and fastened together to provide an enclosure for a trap mechanism generally indicated at 12 therewithin.

The mousetrap 10 includes a main body member generally indicated at 14 which may be an extruded part with open ends formed to include side walls 16, a roof portion 18 and a bottom wall 20. The body member 14 provides a passageway and an enclosed space of sufficient length to receive and contain a mouse that has been induced to enter and become entrapped in the trap so that the dead body will be out of sight. It is also sufficiently narrow to generally preclude any movement of the mouse entering the housing in other than head-on movement towards the trap mechanism 12. And, in particular, it precludes any opportunity to approach the bait in the trap 10 from the sides or behind as will subsequently be more fully described hereinafter.

The front end of the main body member 14 is provided with a front wall member 22 through which a mouse hole opening 24 extends therethrough thereby simulating an arched doorway. The back end of the main body member 14 is closed by a back wall member 26 which has the trap mechanism 12 assembled and mounted thereon before the back wall member 26 is fixed in place at the back end. As shown in FIGS. 1-4, the trap mechanism 12 is loaded or cocked to trap and kill an unsuspecting mouse or rodent.

The back wall member 26 includes a shoulder stepped edge 28 which is formed and provided for fitting engagement and fastening of the back wall member 26 to the main body member 14 as by adhesive bonding, heat sealing or otherwise.

Referring now the back wall member 26, this part is formed to include a pair of relatively spaced and outwardly projecting tabs generally indicated at 32 and 34. The projecting tabs 32 and 34 are integrally formed with the back wall member 26 on the inner face near the lower edge thereof. The projecting tabs 32 and 34 have integrally formed therewith opposing cylindrical projecting portions 31 and 33, respectively, which provide bearing support for pivotal actuation of a bail wire 36 of the trap mechanism 12.

The bail wire 36 is formed to include an open loop with side arms 38 and 40, a cross wire 42 and a pair of torsion springs 44 and 46 integrally formed at opposite ends of the side arms 38 and 40, respectively. Each of the torsion springs 44 and 46 has a corresponding tang 48 and 50, respectively, for engagement with the back wall member 26. When the bail wire 36 is drawn up and held near the back wall member 26 it is under the torsion load of the springs 44 and 46 as shown in the solid lines in FIGS. 1, 2, and 3 and when tripped it is actuated into the position shown by the phantom lines in FIG. 4.

Each of the torsion springs 44 and 46 are mounted over the portions 31 and 33, respectively. The torsion springs 44 and 46 extend beyond the length of their respective projecting portions 31 and 33. The bail wire 36 is held on the portions 31 and 33 against the inner surfaces 49 and 51 of the tabs 32 and 34, respectively, due to the inherent springing action of the side arms 38 and 40 of the bail wire 36.

Figure 2:
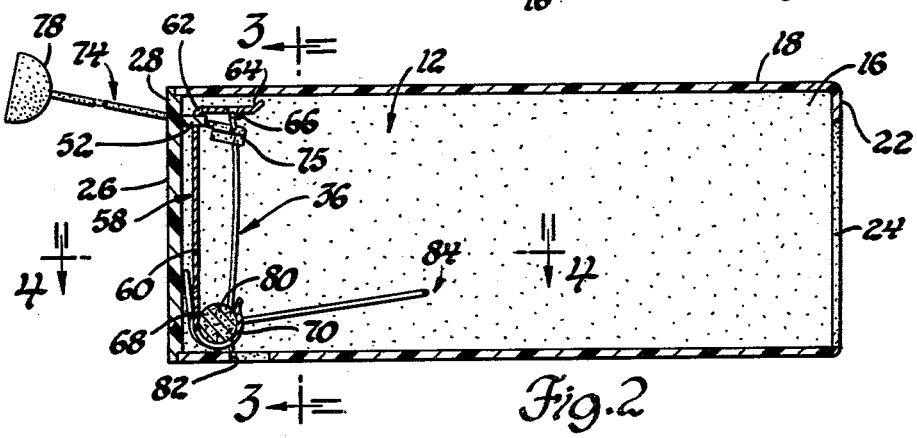
FIG. 2 is a side cross-sectional view of the mousetrap.

A t-shaped nib 52 is integrally formed on the back wall member 26 for the movable support of a catching member generally indicated at 58. The metal catching member 58 includes a middle section part 60 having an elongated slot 62 extending therethrough adjacent an upper projecting flange 64 with a bail wire catch 66 formed therein. The elongated slot 62 also extends through the connecting portion of the upper flange 64 as best shown in FIG. 2. A lower disposed end 68 of the catching member 58 extends forwardly and downwardly and is forked and curled as at 70 to receive and hold bait for the trap 10 as will be described in greater detail hereinafter.

Figure 3:
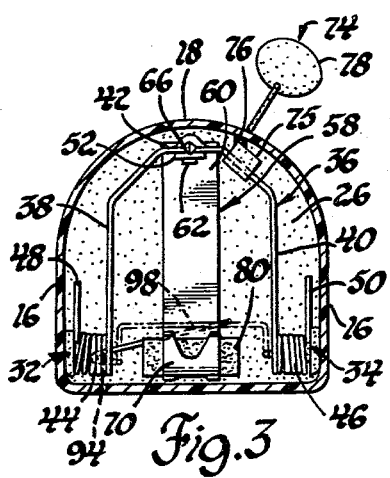
FIG. 3 is a front cross-section view of the mousetrap taken along the line 3—3 of FIG. 2.

The catching member 58 is loosely mounted on the t-shaped nib 52 so as to be pivotally movable about the nib 52 in in a plane parallel to the plane of the back wall member 26 and movable to a limited extent in the direction perpendicular to the back wall member 26. The nib 52 extends through the aperture 62, the upper flange 64 resting on the top surface of the nib 52. The width of the aperture or slot 62 is smaller than the length of the cross-member of the t-shaped nib 52 as is best shown in FIG. 3. The catching member 68 is relatively free to swing on the nib 52 while the lower disposed end 68, particularly when holding bait, is weighted so that the upper end or flange 64 is disposed for interfering engagement with the cross wire 42 of bail wire 36 when it is being loaded to catch and hold the bail wire 36 behind the catch 66. The eading end of the forwardly projecting flange 64 is bent so that the bail wire 36 will pass under and be hooked behind the catch 66 when the trap 10 is being set.

A light nylon or otherwise strong flexible cable generally indicated at 74 is fastened to the bail wire 36 by a grooved integrally formed snap member 75. The cross wire 42 is snapped into the groove of the resilient member 75 near the top of the side arm 40. The cable 74 is fed into a small notch 76 in the back wall member 26 at the upper edge thereof. The length of the cable 74 includes a ball 78 integrally formed on the outside end thereof for finger gripping purposes in pulling the bail wire 36 into its loaded or set condition when the cable 74 is attached to the bail wire 36.

In actual practice the cable 74 need only be long enough to provide some slack when the trap 10 is sprung. The free hanging condition of a ball 78 serves to indicate a loaded and unsprung trap, while a raised ball 78 signals that the trap 10 has been sprung and has caught its prey therein.

Figure 4:
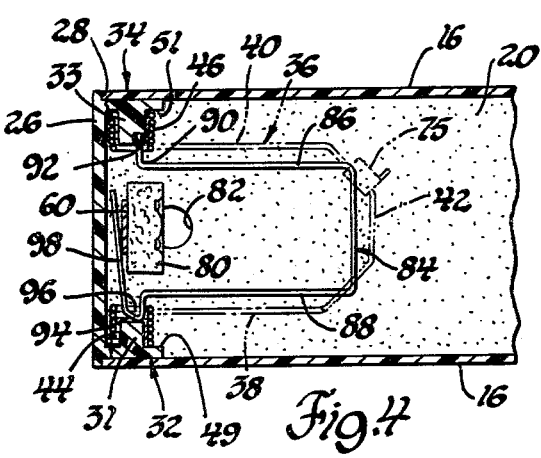
FIG. 4 is a top cross-sectional view, partially broken away, of the mousetrap taken along the line 4—4 of FIG. 2.

A small roll of cotton waste 80 or other absorbent material is provided in the fork and curled end 70 of the bail catching member 58. A small hole 82 is shown in FIGS. 1, 2, and 4 is provided through the bottom wall 20 of the body member 14 immediately under the lower disposed end 68 of the catching member 58. A few drops of a liquid substance considered to attract and entice mice and like small rodents into the trap 10 may be dispensed through the hole 82 and onto the cotton waste 80. The access hole 82 is relatively small and is completely obscure when the trap 10 is sitting flat on its bottom wall 20.

The trap mechanism 12 also includes a tripping member generally indicated at 84. The tripping member 84 has a pair of side arms 86 and 88 which have substantially the same length as the side arms 38 and 40. A first end or bent portion 90 of the side arm 86 is received in a groove 92 formed in the outer surface of the projecting portion 33. The first end 90 of the side arm 86 is allowed to pivotally rotate therewithin the groove 92 and is secured within the groove 92 by the coils of the torsion spring 46.

An elbow portion 94 is formed by the other side arm 88 and is pivotally disposed within a recess 96 defined by the end surface of the portion 31 and the inner peripheral surface of the torsion spring 44.

The tripping member 84 also includes a return end 98 integrally formed with the elbow portion 94 and which engages the lower disposed end 68 of the catching member 58 as shown in FIG. 4 in order to move the catching member 58 out of catching engagement with the bail wire 36. When the tripping member 84 moves downward as shown in FIG. 2 it pivots about the longitudinal axis of the projecting portions 31 and 33 thereby causing the return end 98 and the catching member 58 to move forwardly as shown in FIG. 3.

To place the mousetrap 10 in use, the finger gripping ball 78 is pulled to tighten the cable 74 and draw the bail wire 36 against the resistance of the torsion springs 44 and 46 up and back towards the back wall member 26. As the bail wire 36 is drawn up against the resistance of the torsion springs 44 and 46, the lower portion of the side arm 38 of the bail wire 36 slidably engages the elbow portion 94 of the tripping member 84 to pivotally move the tripping member 84 upward towards the position shown in the FIGS. 1-4. At the same time, the return end 98 of the tripping member 84 moves towards the back wall member 26 thereby allowing the catching member 58 to move towards the back wall member 26. The normally weighted, lower disposed end 68 of the catching member 58 causes the catch 66 to engage and hold the bail wire 36 after it passes thereunder and the tension of the cable 74 is released.

The trap 10 is then turned bottom side up so that a liquid bait may be applied through the bottom wall hole 82 and onto the cotton waste 80 held in the fork and curled end 70. The trap is now set and readly to be placed in a dark corner or wherever desired and intended to be used.

When a mouse enters the opening 24 and approaches the baited trap mechanism 12 on the back wall member 26, there is limited space and the scent of the bait permeates the enclosure. Consequently, the mouse is induced to and must approach head-on to the trap area and upon closely approaching the bait will trip the tripping member 84 and will have his head in that area under the bail wire 36 for the quick kill. The bail wire 36 is purposely close fitting relative to the side walls 16 of the body member 14 to preclude any side access and there is no approach a mouse can make behind or inside the bail wire 36 due to the restricted space.

Once the trap is sprung, it may be disposed of or reused by being reset and emptied over a waste receptacle.

From the foregoing, it is shown that a small and relatively inexpensive mousetrap can be made and provided which is essentially self-contained, which has improved means for springing the loaded trap and which can be baited and set without handling other than the outer housing part. It is also shown that the trap 10 is disposable and may be thrown away with the entrapped mouse after it has served its intended purpose to thereby avoid the unsightliness and distasteful chore otherwise involved in disposing of a mouse and the trap.

The trap 10 may also be reused by simply holding the trap 10 over a waste receptacle with its open end down and resetting the bail wire 36 whereupon the dead mouse will drop out of the open end.

The trap is obviously safe for pets and small children since the trap mechanism 12 including the tripping member 84 is inaccessibly disposed on the back wall member 26 which is too far back for probing fingers in the mouse opening 24, the opening 24 being purposely too small for a small hand or an animal's paw.

While the preferred embodiment of the trap 10 has been shown and described herein in detail, those skilled in this art will recognize various alternative design embodiments for practicing the present invention as defined by the following claims.

What is claimed is:

1. A trap for mice and other rodents comprising;
a member for providing a passageway of sufficient length to receive and retain a rodent therewithin;
a ground level access provided at one end of said passageway member and a back wall member provided at the other end and for closure thereof,
a spring loaded bail wire trap mechanism mounted wholly upon said passageway member, and said passageway member having enclosing and restrictive wall surfaces sufficiently closely spaced to preclude other than a frontal ground level approach by a rodent attracted into said passageway member and relatively towards said trap mechanism, said passageway member having upper, side and bottom walls providing said enclosing and restrictive wall surfaces and being formed to receive and retain said back wall member in fixed engagement therewith and with said trap mechanism assembled thereon, said back wall member including a pair of spaced projecting portions disposed near the lower edge of said back wall member, said trap mechanism including a spring loaded bail wire movably mounted on said projecting portions of said back wall member, a bail wire catching member movably mounted on said back wall member and having a weighted end respective of rodent attracting bait, an access notch through said back wall member and a cable connection through said notch and engaged to said bail wire for drawing said bail wire up towards said back wall member and into catching engagement with said catching member, said trap mechanism further including a tripping member movably connected to said projecting portions, said bail wire securing said movable connection and wherein said tripping member moves said catching member out of said catching engagement with the bail wire after a fixed amount of movement by said tripping member.

2. The trap of claim 1 wherein said bail wire is u-shaped, the torsion springs being integrally formed at opposite ends thereof, each of said torsion springs mounted over said projecting portions, one of said portions having a groove formed therein for receiving a first end of said tripping member, said tripping member having an elbow portion and wherein the other portion and its mounted torsion spring define a recess for receiving said elbow portion to allow for pivotal movement of said tripping member, the second end of said tripping member moving said catching member out of catching engagement with said bail wire.

3. The trap of claim 1 or claim 2, wherein said catching member includes a middle section part and an upper flange projecting substantially perpendicularly therefrom, the middle section part having an elongated slot extending therethrough adjacent said projecting flange, said catching member being movably mounted on a t-shaped nib projecting from said back wall member, said nib extending through said aperture, said upper flange resting on the upper surface of said nib, the width of said slot being smaller than the length of the cross member of the t-shaped nib.

4. The trap of claim 3 wherein said notch extends through said back wall member at the upper edge thereof.

* * * * *